United States Patent [19]

Stolp et al.

[11] 4,341,713

[45] Jul. 27, 1982

[54] PROCESS FOR OBTAINING CORN OIL FROM CORN GERM

[75] Inventors: Klaus-Dieter Stolp, Grefrath; Rolf W. Stute, Flein, both of Fed. Rep. of Germany

[73] Assignee: CPC International Inc., Englewood Cliffs, N.J.

[21] Appl. No.: 219,772

[22] Filed: Dec. 23, 1980

[30] Foreign Application Priority Data

Apr. 18, 1980 [GB] United Kingdom ................. 8012909

[51] Int. Cl.[3] ............................ C09F 5/02; C11B 1/00

[52] U.S. Cl. .................................. 260/412.2; 260/412

[58] Field of Search .............................. 260/412, 412.2

[56] References Cited

U.S. PATENT DOCUMENTS

| | | | |
|---|---|---|---|
| 2,101,371 | 12/1937 | Lava | 260/412.2 |
| 2,310,184 | 2/1943 | Schopmeyer | 260/412.2 |
| 2,329,328 | 7/1943 | Lachle | 260/412.3 |
| 3,832,233 | 8/1974 | Fritze | 260/412.2 |

FOREIGN PATENT DOCUMENTS

| | | |
|---|---|---|
| 880643 | 4/1980 | Belgium . |
| 1402769 | 8/1975 | United Kingdom . |

OTHER PUBLICATIONS

Rhee, et al., J. Food Science, 38, 126–128 (1973).

*Primary Examiner*—John F. Niebling

[57] ABSTRACT

A high quality corn oil is obtained by an aqueous extraction of corn germ. Conventional mechanical expression and use of an organic solvent to extract the oil is eliminated by this process.

8 Claims, No Drawings

PROCESS FOR OBTAINING CORN OIL FROM CORN GERM

FIELD OF THE INVENTION

This invention relates to an improved method for producing corn oil from corn germ obtained in the corn wet-milling process, and to the oil resulting from the process.

BACKGROUND OF THE INVENTION

The most common, and perhaps the only commercial process employed today to obtain edible corn oil from corn germ involves expression of subtantially all of the oil from the germ by means of a screwpress, optionally followed by extraction of the remaining oil from the press cake using an organic solvent. Similar processes are generally employed to recover the oil from other oil-bearing vegetable materials such as cottonseeds, soybeans, and coconuts.

Oils obtained by means of expression, with or without subsequent solvent extraction, are characterized by a rather dark brown color, a strong flavor, and undesirably high amounts of free-fatty acids, phospholipids, etc. These oils must be subjected to extensive and costly refining processes to remove the impurities and render them suitable for food use.

It has long been assumed that many of the impurities in crude (i.e., unrefined) vegetable oils result from the high temperatures (up to about 150° C.) to which they are subjected during the conventional process, and this, plus the detrimental effect of the conventional process upon the quality of the protein contained in the vegetable materials and the hazards and costs involved in solvent extraction, has for many years led workers to search for practical methods to obtain vegetable oils employing relatively low temperatures and using water as the extraction medium.

As early as 1943, F. B. Lachle, in U.S. Pat. Nos. 2,325,327 and 2,325,328, disclosed and claimed a process for extracting oil from vegetable and animal materials comprising milling the oil-bearing material, in the presence of water, in a ball mill or similar device to "substantially cellular form" in order to liberate the oil from the oil cells.

Lachle exemplifies several oil-bearing starting materials including corn germ. It is clear, although not expressly stated, that the corn germ used by Lachle was dry germ, probably obtained via the dry-milling process.

Apparently, the Lachle process has never been used commercially for the recovery of corn oil or other oils. This may be because Lachle clearly teaches the necessity of milling to an exceedingly fine degree, i.e., to "substantially cellular form", which is a time- and energy-consuming operation.

The first commercial aqueous low temperature process for recovering lipid material is the process developed by Israel Harris Chayen, which has been widely reported in patents and other publications, e.g., U.S. Pat. No. 2,828,018. This process, which was first developed for recovering fat from bones or other animal waste products, basically involves subjecting the material, in the presence of water, to intense impacts, as by means of a hammer mill, removing the solids, and finally separating the fat and water.

When the process is applied to animal products, fat and water separation is a relatively easy matter, because most of the fat will rise to the surface during a settling operation. However, attempts to apply it to vegetable materials have invariably presented problems in the formation of complexes of the oil with the protein present and/or the formation of oil-in-water emulsions which are extremely difficult to break.

Other reported aqueous extraction processes and modifications have certain features in common. They generally involve milling the raw material without any water being added. Milling in the presence of water is said to result in undesirable emulsion formation. After milling, water (usually alkaline water, at a pH of about 10) is added to extract the oil and the solubilized protein. The solid and liquid phases are then separated, as by centrifugation or filtration, and the pH of the liquid phase is lowered to precipitate out and recover the protein. The remaining liquid phase, consisting of an oil-in-water emulsion, is then treated to break the emulsion, and the oil is finally recovered by centrifugation.

These processes are generally characterized, partially because of the problem of emulsion formation, by (1) numerous processing steps, (2) the use of expensive and energy-consuming equipment, and/or (3) one or more chemical additions, such as the adjustment of pH during the process. We have developed a process for recovering an exceptionally high quality crude corn oil involving a minimal number of processing steps, using equipment having relatively low energy requirements, and requiring no chemical additives.

SUMMARY OF THE INVENTION

Briefly, in accordance with the invention, there is provided a process for extracting a high quality corn oil from corn germ obtained from the corn wet-milling process which requires only mild refining to produce an edible oil. The process involves milling the wet corn germ at a pH of from about 3 to about 4 at a temperature of less than about 50° C. until at least about 80% of the germ is reduced to a particular size of less than 160 microns. At least the final stage of the milling operation is conducted in an aqueous slurry containing from about 10% to about 25% solids on a dry solids basis. Water is added to the aqueous slurry, if necessary, to bring the dry solids content to less than about 17%. The slurry is promptly subjected to leaching forces, sufficient to separate the slurry into a solid phase and a liquid phase containing substantially all of the oil. The oil is promptly separated from the liquid phase.

In keeping with the invention, the liquid phase containing substantially all of the oil is preferably separated into an oil-enriched fraction and an aqueous fraction containing virtually no oil. Oil is then separated from this oil-enriched fraction.

DETAILED DESCRIPTION OF THE INVENTION

The raw material for the practice of the invention consists of wet corn germ obtained from the germ separators in the classical corn wet-milling process. The corn wet-milling process is well known and has been extensively described in the literature. See, for example, the chapter entitled "Starch", by Stanley M. Parmerter, beginning on page 672 of Volume 18 of *Kirk-Othmer Encyclopedia of Chemical Technology, Second Edition*, Interscience Publishers, a division of John Wiley & Sons, Inc., New York, London, Sydney, Toronto (1969). This germ fraction will contain about 50% water by weight (throughout the specification all percentages are by weight unless otherwise stated) and will have a pH, within the range of about 3–4. It should be noted that at no time during the process of the invention is any pH adjustment made, and therefore this pH will change little throughout the process.

The milling step can be performed with any device or devices provided the following conditions are met. First, at no time during the milling step should the temperature exceed 50° C. This upper temperature limit is important both to the quality of the oil ultimately obtained and to the efficient separation of the various components. When milling devices are used which generate a large amount of heat, the temperature can be maintained below 50° C. by the addition of water.

At least the final stage of the milling step is conducted in the presence of sufficient added water to form an aqueous slurry having 10%–25% solids. The additional water can be added to the wet germ prior to the milling step or during the milling. Fresh tap water, process water recycled from a later stage of the process, or a combination of both, is used.

A third requirement of the milling process is that at least 80% of the germ must be reduced to a particle size of less than 160 microns. It has been discovered that the amount of oil which can be liberated from the milled germ is proportional to the amount of germ milled to below 160 microns. For practical and economic reasons, at least 80% of the germ should be reduced to this particle size. Preferably, about 90% to 95% of the germ is reduced to this particle size to permit the maximum oil recovery.

The milling is performed so that the germ cells are opened, but the cell walls are otherwise substantially undamaged. That is to say, when viewed under the microscope the majority of the germ cells will be intact with the exception of a single break, or opening, in the cell wall. This can readily be accomplished by milling just until the desired amount of the cells (at least 80% and preferably at least 90–95%) has reached a particle size of below 160 microns. More intensive milling, which reduces the particle size of the entire mass to below about 50 microns, should be avoided. Intensive milling devices, such as ball mills and hammer mills, will normally cause substantial damage to the cell walls, which will result in excessive emulsification and other problems when the oil is extracted from the milled germ.

Suitable devices for carrying out the milling step include a tooth-disc mill, such as the Fryma mill, manufactured by the Fryma Company, and the Manton-Gaulin homogenizer, manufactured by the Manton-Gaulin Manufacturing Company, Inc., Everett, Mass. The wet corn germ is conveniently reduced to the desired size in a continuous process by passing the wet germ slurry first through a Fryma mill and then through the Manton-Gaulin homogenizer.

The next step of the process consists of subjecting the milled material to what we shall term as "leaching forces" in order to leach the oil from the germ. By "leaching forces" is meant a centrifugal force of a magnitude of at least 1,000×g. Further, the device applying the centrifugal force must be one which maintains the liquids and solids in an agitated state during operation, rather than building up a layer, or "cake", of solids through which the liquid must pass.

Solid bowl centrifuges (also known as centrifugal decanters) have been found to be very effective in providing the leaching forces required in the practice of the invention. Discontinuous sieve centrifuges, which exert centrifugal force but form a layer of solid material through which the liquid must pass, are unsuitable. Likewise, filtration, even with high vacuum as in a Buchner funnel, and even with constant agitation to prevent layer formation, does not effectively leach the oil into the liquid phase.

It has been found that the leaching operation is most effective when applied to a milled slurry having not more than about 17% dry substance. Therefore, if the slurry exiting from the milling step has a higher solids content (e.g., up to 25%), it should be diluted with water prior to the leaching step.

The leaching step separates the slurry into solid and liquid phases, the solid phase consisting of the germ fiber plus some water-insoluble protein, the liquid phase consisting of the oil, dispersed insoluble protein, water-soluble protein, lipids, and phosphatides.

Normally, the leaching step needs to be applied a second time to the germ fiber recovered from the first pass (after first reslurrying in water, of course) in order to extract into the liquid phase all of the oil released by the milling. Depending upon the specific centrifugal device and conditions employed, a third pass may also be needed for maximum oil recovery. The skilled operator can readily select optimum conditions for his particular operation.

The oil-free germ fiber has not been heat-damaged as is the case with germ fiber coming from the conventional corn oil process. As a result, it contains a relatively high proportion of good quality protein, and finds use as a highly nutritious animal feed—an additional advantage of this process.

It would be expected that the liquid phase coming from the centrifugal decanter, or the like, would comprise a tight emulsion and/or a good portion of the oil would be firmly held in the form of a complex with protein. Surprisingly, this is not the case, and the liquid phase can be separated readily into oil, water and sludge by conventional means.

Furthermore, if the liquid phase from the leaching step is transferred into a holding vessel, it will rapidly separate into two distinct layers. The lower layer, which will comprise at least 60% of the total liquid phase, consists almost entirely of water plus the water-soluble protein and contains virtually no oil. The upper oil-enriched layer contains virtually all of the oil and the remaining water in the form of a very loosely held oil-in-water emulsion, containing insoluble protein dispersed therein. This emulsion can readily be broken and the components separated and recovered by conventional equipment. In a preferred embodiment, advantage is taken of the "self-separation" phenomenon by promptly discharging the liquid phase from the leaching step into a vessel. The upper (oil-enriched) layer which separates is sent to the next step of the process. The lower (aqueous) layer can be recycled back to an earlier step of the process.

Alternatively, the liquid phase can be separated by other means, such as by subjecting the liquid phase to mild centrifugal forces (below 3,000×g). This technique, whereby the major portion of the water is separated from the oil to leave an oil-enriched fraction for further processing, is described in Example III. It is also possible to employ both separation techniques, i.e., to apply first a "self-separation" step and then subject the top layer to mild centrifugal forces to remove additional water therefrom.

The next, and final, step involves separating and recovering the oil, preferably by means of a 3-way separation yielding oil, water and sludge. For this final step, it is greatly preferred to employ a three-way centrifuge, but other conventional means can also be employed. The three-way centrifugation yields the crude oil, water which may be recycled to the milling stage, and a sludge containing proteins, phospholipids, plus a small amount of oil. The sludge may be subsequently processed to separate out the components, all of which are of good quality, not having undergone the heat damage characteristic of the conventional process.

It will be noted that each step of the process should follow promptly the preceding step; any lengthy delays, or holding periods, between the steps will result in undesirable emulsion formation and/or inefficient separation of the components. For this reason, plus the fact that continuous processes are normally deemed to be most efficient in industrial operations, it is greatly preferred to perform the process of the invention in a continuous manner.

The crude oil is characterized by a light golden color and a pleasant, bland taste, and requires only mild final refining.

The following examples illustrate certain embodiments of the present invention. Unless otherwise stated, all proportions and percentages are provided on the basis of weight.

EXAMPLE I

Wet corn germ from the corn wet-milling process, containing approximately 50% water and having a pH of 3.6, was first screened to remove residual material, hulls, stones, pieces of corn corb, etc. The process was operated continuously as follows. To 120 kg/hr of the wet germ was added 240 kg/hr of fresh tap water, resulting in a slurry of 16.6% dry substance. This was milled by passing the slurry first through a Fryma mill, type MK 180 (a tooth-disc mill manufactured by the Fryma Co.). The mill was operated under standard conditions. From the Fryma mill, it was continuously sent to a Manton-Gaulin homogenizer, type M6-8TBS, operated at about 500 kg/cm$^2$. At the end of the milling step, nearly 95% of the material had been reduced to a particle size of below 160 microns, the particle size distribution of the total being as follows:

| | |
|---|---|
| Above 500 microns | 0.47% |
| 200-500 microns | 2.68% |
| 160-200 microns | 2.54% |
| 63-160 microns | 24.22% |
| Below 63 microns | 70.09% |

It should be noted that a large portion of the material below 63 micron size consisted of oil, proteinaceous material and ash rather than germ fiber.

The milled slurry was continuously diluted with water at 240 kg/hr and was then passed directly to a Westfalia centrifugal decanter, type CA220, operated at 5500 rpm. The residue was immediately mixed with about 450 kg of water and sent to a second centrifugal decanter, a Flottweg, type Z32-3, operated at 5000 rpm. The liquid phases from both decanters were analyzed and were found to be practically free of germ residue. The germ residue from the second decanter had 25% dry substance and contained 5% oil, based on dry substance (determined by extraction with carbon tetrachloride), indicating that about 95% of the total oil content of the germ had been liberated.

The liquid phases from both decanters were sent continuously, at 50°-60° C., to a Westfalia type SA 14, three-way centrifuge operated under standard conditions, which yielded a liquid oil fraction, a sludge fraction and an aqueous fraction. Of the total oil entering the centrifuge, about 85% was recovered in the oil fraction, about 11% was found in the sludge fraction (which could later be separated if desired) and about 4% was found in the aqueous fraction. This aqueous fraction was recycled back to the milling step.

The liquid oil fraction was characterized by a light golden color, a pleasant odor and a fresh taste. The following table sets forth a comparison of the properties of the crude (i.e., unrefined) oil obtained by the process of the invention with those of a crude oil obtained by the conventional process of expression:

| | Crude Oil Obtained by the Invention | Conventional Crude Oil Obtained by Expression |
|---|---|---|
| Free Fatty Acids, % | 1.2-1.4 | 1.9-2.7 |
| Peroxide Value, meq, $O_2$/kg oil | 0 | 0.7-1.6 |
| Color (yellow/red, lovibond method) | 42/10.6 | Too dark to measure |
| Viscosity, 40° C., cps | 28.6-29.2 | 30.4-31.7 |
| Clarity, % | Almost 100 | About 10 |

As can readily be appreciated from the comparative data, the crude oil obtained by the process of the invention required substantially less and milder refining than did the conventional crude oil to make it suitable for food use.

EXAMPLE II

This example illustrates the use of the "self-separating" step.

Example I was repeated except the liquid phases from the two centrifugal decanters were sent to a settling tank whereupon the liquid promptly separated into two layers. The bottom layer comprised 73% of the total liquid and contained virtually no oil, it was recycled back to the milling step. The top layer (comprising 27% of the total) contained, on a dry substance basis, 87% oil and 12% protein (N×6.25); it was promptly sent to the 3-way centrifuge as in Example I.

The liquid oil fraction was of the same high quality as that obtained in Example I.

EXAMPLE III

Example I was repeated except the liquid phases from the decanters were sent to a Heraceus-Christ centrifuge and centrifuged at about 1,500×g for 5 minutes. This resulted in removal of 90% of the water, which was virtually free of oil. The oil-rich concentrate, which had a dry substance content of about 40%-50%, was then sent to another Heraeus-Christ centrifuge at a peak g of 10,000 for 4 seconds, the total centrifugation operation lasting 4 minutes. The liquid oil fraction exiting from the centrifuge was of the same high quality as that obtained in the previous examples.

Thus, it is apparent that there has been provided, in accordance with the invention, a process that fully satifies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to include all such alternatives, modifications, and variations as set forth within the spirit and broad scope of the appended claims.

What is claimed is:

1. A process for extracting a high quality corn oil from wet corn germ obtained from the corn wet-milling process, which requires only mild refining to produce an edible oil, comprising the steps of:

(a) milling the wet corn germ at a pH of from about 3 to about 4 and at a temperature of less than about 50° C. until at least about 80% of the germ is reduced to a particle size of less than 160 microns with at least the final stage of the milling operation being conducted in an aqueous slurry containing from about 10% to about 25% solids on a dry solids basis;

(b) diluting the aqueous slurry with water if necessary to bring the dry solids content to less than about 17%;

(c) promptly subjecting the slurry to leaching forces sufficient to separate the slurry into a solid phase and a liquid phase containing substantially all of the oil; and (d) promptly separating the oil from the liquid phase.

2. The process of claim 1 wherein at least 90% of the germ is reduced to a particle size of less than 160 microns during the milling step.

3. The process of claims 1 or 2 which includes the additional step of separating the liquid phase from step (c) to form an oil-enriched fraction plus an aqueous fraction containing virtually no oil, and sending said oil-enriched fraction to step (d).

4. The process of claim 3 wherein the aqueous fraction is recycled to an earlier step of the process.

5. The process of claim 3 wherein the additional separation step is accomplished by promptly transferring the liquid phase from step (c) to a holding vessel, whereby said liquid phase rapidly separates into two layers, the upper layer comprising an oil-enriched fraction and the lower layer comprising an aqueous, virtually oil-free, layer; removing the upper oil-enriched fraction, and sending said oil-enriched fraction to step (d).

6. The process of claim 5 wherein the upper oil-enriched fraction is subjected to mild centrifugal forces before it is sent to step (d).

7. The process of claim 3 wherein the additional separation step is accomplished by subjecting the liquid phase from step (c) to mild centrifugal forces, thereby producing an oil-enriched fraction and an aqueous, virtually oil-free fraction, removing the oil-enriched fraction, and sending said oil-enriched fraction to step (d).

8. The process of claim 1 wherein step (c) is accomplished by means of a centrifugal decanter.

* * * * *